(12) United States Patent
Anais et al.

(10) Patent No.: US 12,498,716 B2
(45) Date of Patent: Dec. 16, 2025

(54) DEVICE, ALGORITHM AND CLOUD-BASED SYSTEM FOR BUILDING MAINTENANCE MANAGEMENT

(71) Applicant: BuzzzTV LTD, Tirat HaCarmel (IL)

(72) Inventors: Avraham Anais, Tel-Aviv Yaffo (IL); Ran Sinai, Geva Carmel (IL); Evgeni Kitz, Haifa (IL); Boaz Avni, Atlit (IL)

(73) Assignee: BuzzzTV LTD, Tirat HaCarmel (IL)

( * ) Notice: Subject to any disclaimer, the term of this patent is extended or adjusted under 35 U.S.C. 154(b) by 475 days.

(21) Appl. No.: 18/025,447

(22) PCT Filed: Sep. 9, 2021

(86) PCT No.: PCT/IL2021/051099
§ 371 (c)(1),
(2) Date: Mar. 9, 2023

(87) PCT Pub. No.: WO2022/054058
PCT Pub. Date: Mar. 17, 2022

(65) Prior Publication Data
US 2023/0315086 A1    Oct. 5, 2023

Related U.S. Application Data (60) Provisional application No. 63/236,261, filed on Aug. 24, 2021, provisional application No. 63/077,374, filed on Sep. 11, 2020.

(51) Int. Cl.
*G05D 1/00* (2024.01)
*G06Q 10/06* (2023.01)

(52) U.S. Cl.
CPC ......... *G05D 1/0016* (2013.01); *G05D 1/0022* (2013.01)

(58) Field of Classification Search
None
See application file for complete search history.

(56) References Cited

U.S. PATENT DOCUMENTS 11,205,423 B2 * 12/2021 Kanfer .............. G06Q 10/20
11,394,462 B2 *  7/2022 Graham ............ H04L 12/18
(Continued)

FOREIGN PATENT DOCUMENTS

SG    10201707635 W *  4/2019 ...... G06Q 10/06315
WO   WO-2016041586 A1 *  3/2016 ...... H04M 1/72412
(Continued)

OTHER PUBLICATIONS

Supplementary European Search Report and the European Search Opinion Dated Aug. 6, 2024 From the European Patent Office Re. Application No. 21866218.7. (9 Pages).
(Continued)

*Primary Examiner* — Curtis A Kuntz
*Assistant Examiner* — Jerold B Murphy (57) ABSTRACT

A device for placing at the entrance to a maintenance space, comprises a counter to count a number of persons passing the entrance, a touchscreen to obtain structured data about the maintenance space, and a transmitter, associated with the counter and with the touchscreen, for transmitting counting results and structured data to a remote location. A cloud based maintenance regulation system based on the above device is also disclosed.

21 Claims, 10 Drawing Sheets

(56) References Cited

U.S. PATENT DOCUMENTS

| | | | |
|---|---|---|---|
| 2012/0154169 A1 | 6/2012 | Hoekstra | |
| 2013/0124247 A1 | 5/2013 | Yenni et al. | |
| 2014/0068456 A1 | 3/2014 | Chan | |
| 2015/0177917 A1* | 6/2015 | Hoekstra | G06Q 10/10 715/771 |
| 2017/0277272 A1* | 9/2017 | Nordin | H04B 10/116 |
| 2020/0213006 A1* | 7/2020 | Graham | H04L 12/18 |
| 2020/0250774 A1 | 8/2020 | Agarwal | |

FOREIGN PATENT DOCUMENTS

| | | |
|---|---|---|
| WO | WO 2017/185509 | 11/2017 |
| WO | WO 2022/054058 | 3/2022 |

OTHER PUBLICATIONS

Corrected International Preliminary Report on Patentability Dated Jan. 8, 2023 From the International Preliminary Examining Authority Re. Application No. PCT/IL2021/051099. (12 Pages).

International Preliminary Report on Patentability Dated Jan. 8, 2023 From the International Preliminary Examining Authority Re. Application No. PCT/IL2021/051099. (13 Pages).

International Search Report and the Written Opinion Dated Nov. 17, 2021 From the International Searching Authority Re. Application No. PCT/IL2021/051099 (9 Pages).

Anewtech "Toilet Feedback System", Anewtech Systems Pte Ltd., Retrieved From Internet, 7P., Apr. 4, 2018.

Office Action Dated Jul. 17, 2025 From the Israel Patent Office Re. Application No. 301220. (4 Pages).

* cited by examiner

DEVICE, ALGORITHM AND CLOUD-BASED SYSTEM FOR BUILDING MAINTENANCE MANAGEMENT

RELATED APPLICATIONS

This application is a National Phase of PCT Patent Application No. PCT/IL2021/051099 having International filing date of Sep. 9, 2021 which claims the benefit of priority under 35 USC § 119(e) of U.S. Provisional Patent Application Nos. 63/077,374, filed on Sep. 11, 2020, and 63/236,261 filed on Aug. 24, 2021. The contents of the above applications are all incorporated by reference as if fully set forth herein in their entirety.

FIELD AND BACKGROUND OF THE INVENTION

The present invention, in some embodiments thereof, relates to a device, algorithm and cloud-based system for management of building maintenance, including smartphone-based terminal applications.

Building maintenance refers to the tasks necessary to keep a building functional and livable. Large buildings such as office blocks, shopping malls and the like may require cleaning staff and specialists with skills in areas such as plumbing, electrics, heating and air conditioning. Heavily used utilities such as washrooms may require cleaning and replacement of towels and soap at regular intervals, and generally rely on personnel doing a fixed rota. However the fixed rota does not allow for unexpected changes in levels of use, and staff are often hard to contact in case some kind of change is required. Furthermore, there is often no easy way for a member of the public to point out an issue that has arisen, and the only way for management to know whether the rota is working is to carry out spot checks.

It is further noted that monitoring washroom spaces using cameras is problematic. Accordingly, International Patent Application No. PCT/SG2018/050473 to Agarwal et al, filed Sep. 14, 2008 teaches a virtual cleaning supervisor for monitoring the cleanliness of a washroom, alerting cleaners and stakeholders and predicting cleaning schedules. Sensors are installed within the washroom at various locations that measure cleanliness over time. The sensors are not cameras but rather measure such features as air quality.

SUMMARY OF THE INVENTION

The present embodiments may provide an interactive device at the entrance to a maintenance-heavy space such as a public washroom, that allows members of the public to notify at the touch of a button that maintenance is required, and also allows the maintenance staff to record maintenance being carried out. A sensor at the entrance may count entries into the space, and further sensors may sense states in the room volume, such as odor, usage levels of consumables such as soap and towels, and the like, and the various devices may be run on batteries. Embodiments may further provide a central controller, for example cloud based, to coordinate calls for maintenance and send out instructions to terminal applications on the smartphones of maintenance staff. The central controller may also use reactions received to more efficiently allocate maintenance resources and artificial learning techniques may be used to anticipate cleaning and maintenance requirements.

According to an aspect of some embodiments of the present invention there is provided a device for placing at the entrance to a maintenance space, the device comprising:
  a counter configured to count a number of persons passing the entrance;
  a touchscreen configurable for obtaining structured data about the maintenance space, wherein the touchscreen has a first configuration for obtaining maintenance reports from maintenance staff and a second configuration, different from the first configuration, for obtaining reactions and requests from the general public; and
  a transmitter, associated with the counter and with the touchscreen, for transmitting counting results and the structured data to a remote location.

In embodiments, at least one of the first and the second configuration comprises at least one additional configuration, the additional configuration being reachable by selection of an option on the at least one of the first and second configurations.

In embodiments, the touchscreen has a switch configuration for selecting between the first configuration and the second configuration.

Embodiments may be configured with a threshold number, wherein a request for a maintenance team or a cleaning team or a cleaning or other robot is issued via the transmitter when the counter exceeds the threshold number.

In embodiments, the touchscreen is configured with configurable soft buttons and is configured to distinguish between short and long presses on the buttons.

Embodiments may use a battery power source.

In embodiments, the transmitter is configured with a network protocol for a radio-based network.

According to a second aspect of the present invention there is provided a cloud-based system for building maintenance comprising:
  a plurality of devices located at entrances to spaces of the building requiring maintenance, the devices respectively comprising counters for counting persons crossing the respective entrances, touchscreens for obtaining structured data regarding the spaces, wherein the touchscreens respectively have a first configuration for obtaining maintenance reports from maintenance staff and a second configuration for obtaining reactions and requests from the general public, and transmitters for relaying count information and structured data information wirelessly to the cloud; and
  a remote location based in the cloud configured to obtain information from the plurality of devices and schedule maintenance operations at the spaces.

The system may include a control station in communication with the remote location, the control station configured to obtain the count information and the structured data from the cloud.

The system may comprise terminal applications networked via the remote location, the terminal applications configured to work on mobile communication devices and configured to obtain directions regarding maintenance operations.

In embodiments, the touchscreen has at least one additional configuration, the additional configuration being reachable via a selection made on the first or second configuration.

In embodiments, the touchscreen has a third, switch, configuration for selecting between the first configuration and the second configuration.

Embodiments may include a configuration with a threshold number, wherein a request for a cleaning robot or a cleaner or cleaning team or maintenance team is issued via the transmitter when the counter exceeds the threshold number.

In embodiments of the system, the touchscreen is configured with configurable soft buttons and is configured to distinguish between short and long presses on the buttons.

In embodiments, the devices at entrances, and/or sensors located within the space, comprise a battery power source.

An embodiment may be configured to communicate using a network protocol for a radio-based network.

Embodiments may be configured to operate robots based on any of user action requests, sensor activation and activation due to a counter reaching a threshold number.

Embodiments may calculate a cleaning effectiveness score for respective ones of the spaces requiring maintenance.

Embodiments may comprise sensor devices for monitoring levels of consumables, the system being configured to issue a call to prevent a level of a consumable fall below a given threshold.

Embodiments may be configured to place an order for new stock of a consumable.

In embodiments, a timing of the call issuance is based on an average time to answer a call, such that the time the call is made, added to the average time to answer the call, adds up to a time at which the level of the consumable is estimated to fall to the threshold level.

Embodiments may determine from any of a call and a sensor detection an incident start time, and may further determine an incident end time. Then the number of persons exposed to the incident may be obtained from the counter, specifically the number of persons detected by the counter as entering between the incident start time and the incident end time.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to a device, algorithm and cloud-based system for management of building maintenance, including smartphone-based terminal applications.

Applicant's earlier but as yet unpublished provisional U.S. Patent Application No. 63/077,374, filed Sep. 11, 2020 discloses sensors placed around the washroom that detect the level of cleanliness.

The present embodiments may provide a device for placing at the entrance to a maintenance space, comprises a counter to count a number of persons passing the entrance, a touchscreen to obtain structured data about the maintenance space; and a transmitter, associated with the counter and with the touchscreen, for transmitting counting results and structured data to a remote location.

A cloud based maintenance regulation system based on the above device is also disclosed. The system may collect and processes data/information in public service rooms/areas. The system may generate a call to action in real time to a problem and prevent malfunctions, thus supporting cleaning and maintenance staff or cleaning robots, and may provide an up-to-date snapshot of control, and may further provide improvement for the management level.

Support, control and keeping an up-to-date record may be done with sensors and reporting of the cleaning and maintenance situation in a specific room/area, including the activity of the cleaning and maintenance staff at the given location.

Systems according to the present embodiments may learn and thus anticipate the appearance of future patterns of cleaning and maintenance events, and allows streamlining and managing the team accordingly.

Control and improvement are made possible by an algorithm that may provide an index which appears as a score reflecting a real state of the level of cleanliness of the space in question and maintenance thereof.

The index may be adjusted according to possible structural segmentations of the building being serviced, such as high-tech laboratories and research facilities, factories, hospitals, shopping malls/shopping centers, residences etc., each of which has different maintenance requirements. Due to the different requirements of different types of premises, and also because different examples of the same type of premises may have different staffing or usage levels, and different usage patterns, machine learning may be carried out individually for specific systems, rather than using some generalized artificial intelligence for all systems.

The present embodiments may include an app that is provided to the mobile telephones of supervisors, cleaners and maintenance personnel and anyone else involved and the app may provide notifications of requirements via icon, by messaging, and also by voice in the language set up on the telephone to state where and what the problems or situations are. It is noted that in many countries, particularly countries which have guest workers or immigrant communities, the language used by cleaning staff may differ from the language in general use, and the telephone app may use the language settings on the phone to bridge the language gap.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
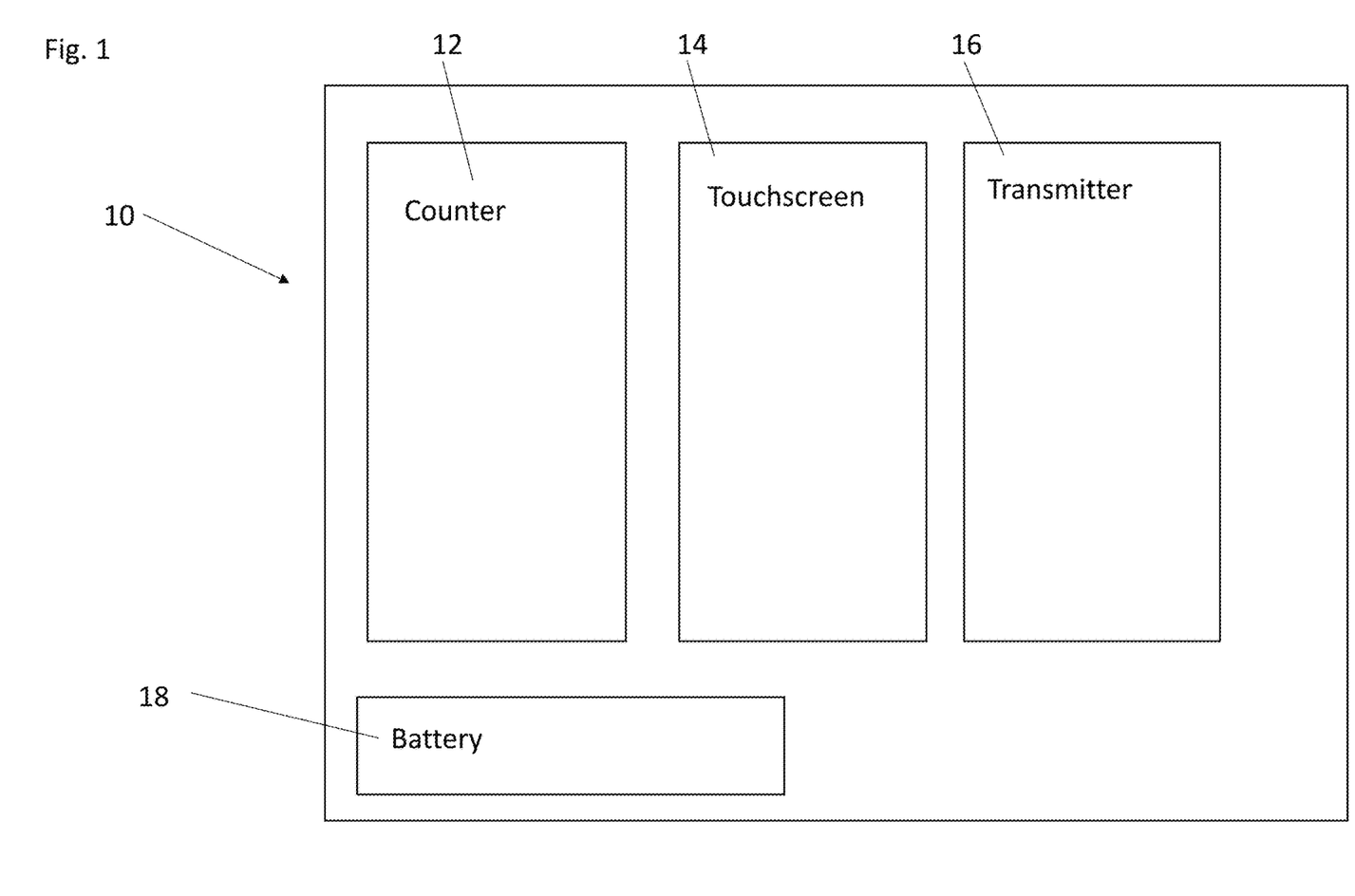
FIG. 1 is a simplified block diagram of a device for placing at the entrance to a washroom according to embodiments of the present invention.

Referring now to the drawings, FIG. 1 illustrates a device 10 that may be positioned at the entrance to a maintenance space such as a washroom. The device 10 comprises a counter 12 to count a number of persons passing the entrance. The requirement for maintenance clearly increases with the number of times the washroom is used and hence a reliable count of the numbers of users may be useful for scheduling maintenance. The positioning of the device at the entrance is preferably carried out in such a way that only persons crossing the entrance are counted and not say passers by. Thus counting may use a beam that crosses the entrance and is broken by anyone entering. Alternatively any of various kinds of proximity detectors may be used, including infra-red detectors.

The device may include a touchscreen 14. The touchscreen may produce an interactive display to obtain information from users about the maintenance space. The information may be obtained in a structured manner, such as asking for the user to assign a number of stars or a score to the cleanliness and state of maintenance. The feedback may include a box to add specific comments, and the touchscreen may also allow maintenance crews to report that they have completed a maintenance procedure. The screen may recognize different types of touches such as short and long touches. Thus maintenance crews may be able to use long touches to obtain menus or screens that the general public do not see. Hence the touch screen may have different configurations or displays under different circumstances and a way of switching between them, with the long touch providing a way of preventing members of the public from using the screens for the maintenance crews. Thus the screen may include configurable soft buttons and may distinguish between short and long presses on the buttons. The display may change depending on the user feedback. Thus if a user indicates that a specific issue needs to be raised, then a screen appropriate to that issue may be displayed.

In general the configuration for the general public may be shown. Alternatively, to save energy, the screen may be blank except when proximity of a user is detected. Other methods of saving energy may be considered.

The device may further include a transmitter 16, which is connected through the device 10 to transmit data obtained from the counter or via the touchscreen to a remote location.

The device may be programmed with a threshold number, wherein a request for a maintenance team is issued via the transmitter when the counter exceeds the threshold number. Alternatively the threshold number may be held at the remote location, the device simply sending the count details, and the remote location carrying out the comparison with the threshold number and generating the maintenance call.

The device may include a battery power source 18. Often maintenance space entrances may lack mains power, or if power is available, it may be desirable to continue operation even when power is cut. Hence a battery power source is available. If mains power is available then the battery is simply a back-up power source and may be recharged from the mains. As will be discussed below, additional sensors for sensing the states of consumables, such as paper towels, soap and toilet paper may be part of the system. These tend to have their positions dictated by the dispensers that they work with and electrical power, even if available, may not be available at the dispenser location.

If the battery power source is the main source of energy then various strategies to minimize power use may be utilized, such as switching off the screen when no-one is close by, or doing all the calculation at a remote location. In an embodiment the screen and most of the rest of the systems may be normally off, although the counter may continue to operate and may be switched on by button press. As the device is switched on, it sends any data that has accumulated and attends to the requirements of the button press. In this embodiment, the device may also be switched on after a preset interval. Again any data that has accumulated, say particularly from the counter, may be sent. Thus the device switches on by button press and also switches on whenever a preset interval has passed without anything happening, so that counter information may get to where it is needed reasonably promptly.

The transmitter may be set up to transmit according to a network protocol. The network protocols may include TCP/IP and may include Ethernet where such a network is available. The protocols may further include Bluetooth™, or WiFi or LoRa or any other protocol for a radio-based network, depending on what connections are available.

Figure 2:
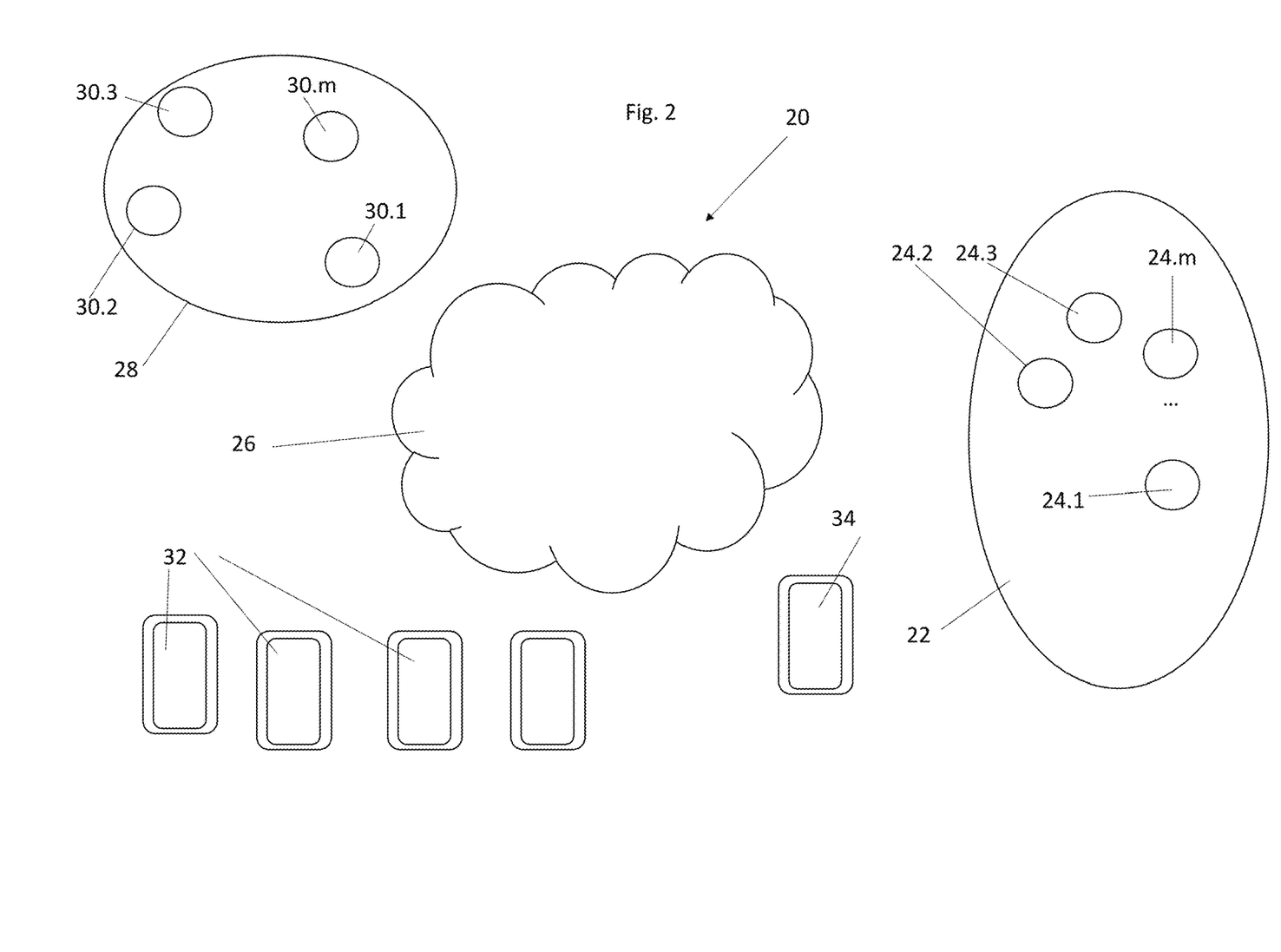
FIG. 2 is a simplified block diagram of a cloud based system using the device of FIG. 1.

Reference is now made to FIG. 2, which illustrates a cloud-based system 20 for building maintenance that includes a location 22 having multiple maintenance spaces 24.1 . . . 24.n. Each space has a device of the kind described above in respect of FIG. 1 and transmits to a remote resource at a remote location. In the present embodiment the remote location is based on the cloud 26, meaning that it is based on a computing resources allocated in an unspecified manner and available over the network, so that the service that is provided is defined but the resource on which the service is located is undefined.

The same cloud-based resource may support another location 28 having multiple maintenance spaces 30.1 ... 30m which may be provided as before with devices according to FIG. 1.

Thus at each location or building, devices are located at entrances to spaces requiring maintenance. The devices include counters for counting persons crossing the entrances to the spaces, touchscreens for obtaining structured feedback regarding the spaces and the maintenance state thereof, and transmitters that relay both count information and structured feedback information wirelessly to the cloud. The cloud based resource may control maintenance of the spaces, based on the count information and structured feedback information as received in the cloud and may direct maintenance operations to the spaces in accordance therewith.

The cloud-based system may further include end user terminal applications that are networked with the cloud. The terminal application may be provided on mobile phones 32 of the maintenance crews. Herein the term "maintenance crew" is used generally to refer to any personnel involved in maintenance of the space, and this may include cleaners, electricians, plumbers etc., so that all kinds of maintenance incidents may be managed according to the present embodiments.

The cloud based system may further include a control station 34 for a supervisor, which may be implemented on a mobile phone or any other computing device. The telephone and associated app may be used to direct the crews as needed to spaces requiring maintenance or to locate the crews. The terminals may also allow the crews to report via the telephone app that the incident has been attended to, as an alternative to using the touch screens. The option to disable reporting via the telephone app may also be available where the operator feels that the touch screen provides better proof that the cleaning staff have in fact attended the incident.

The telephone app may provide notifications of requirements via icon, by messaging, and also by voice in the language set up on the telephone to state where and what the problems or situations are. It is noted that in many countries, particularly countries which have guest workers or immigrant communities, the language used by cleaning staff may differ from the language in general use, and the telephone app may use the language settings on the phone to bridge the language gap.

The control station 34 may allow the supervisor to get in contact with the maintenance crews, to receive updates as to spaces that need maintenance, to see feedback from the devices and to keep in overall track of what is happening. In general the maintenance crews are sent automatically to carry out routine maintenance so the control station is not required to actually control the maintenance crews.

Figure 3A:
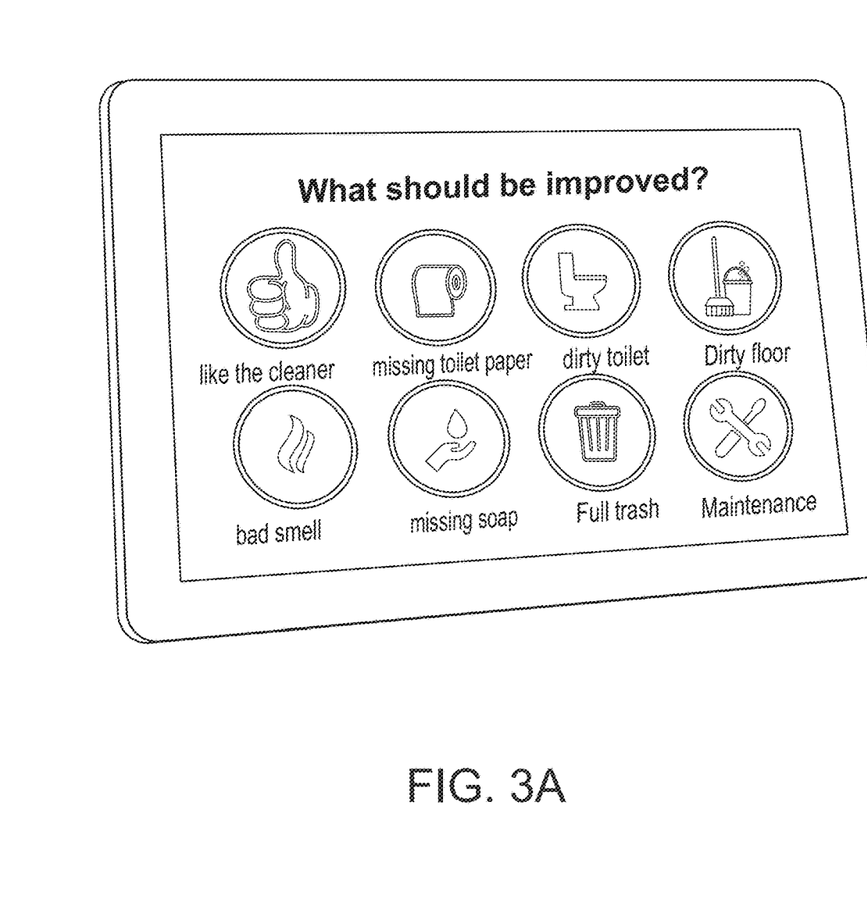
FIGS. 3A and 3B are two exemplary touch screen displays for the device of FIG. 1.
Figure 3B:
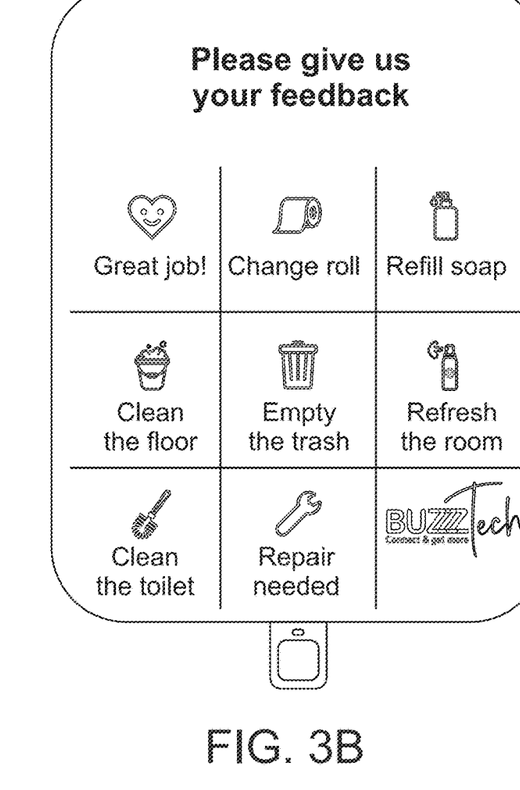

FIGS. 3A and 3B illustrate two exemplary touch screen displays that may be used with the device of FIG. 1. Each display is divided into soft buttons with wording and an illustration to elicit from the user structured information about the state of maintenance.

Figure 4:
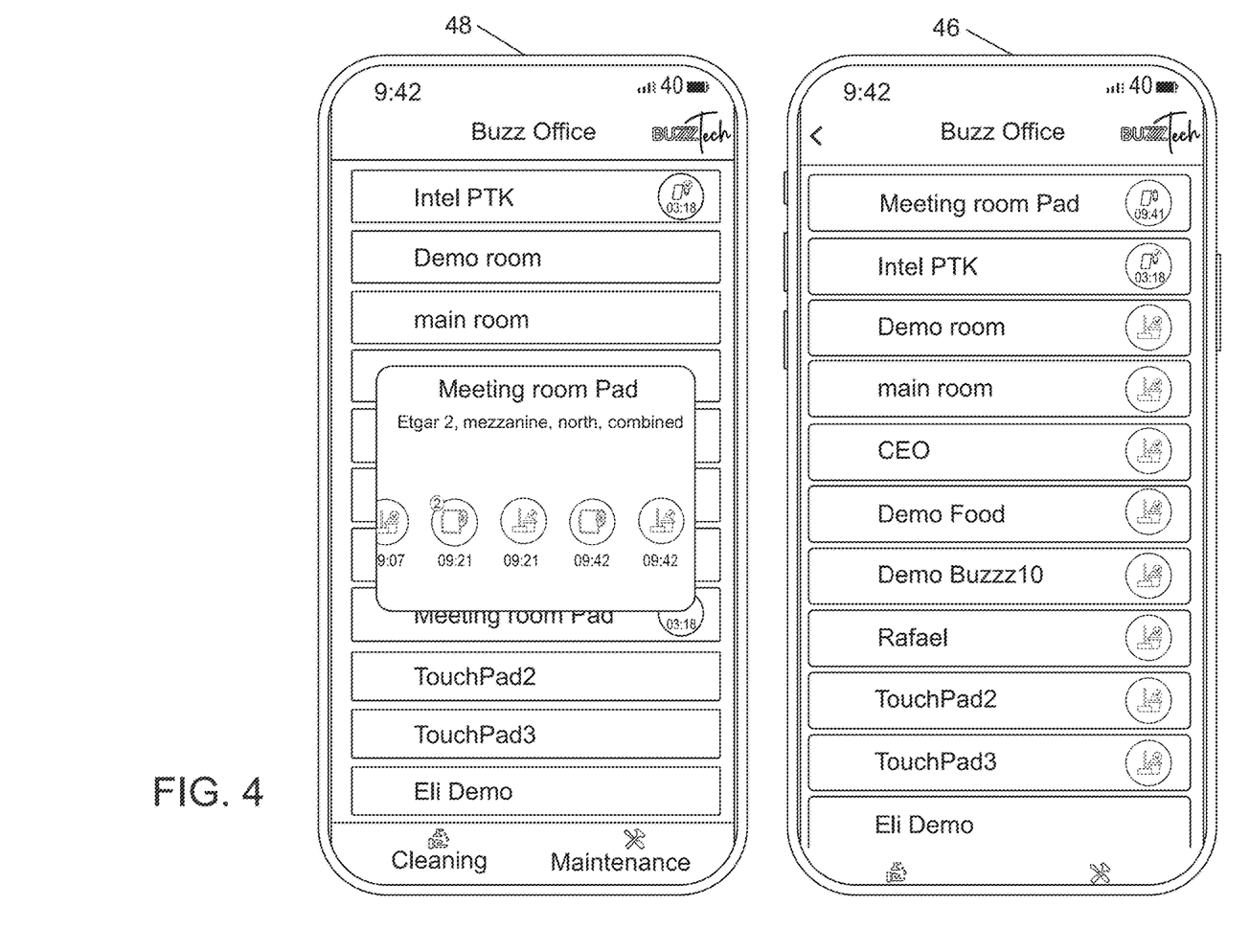
FIG. 4 is a simplified diagram illustrating feedback between a user and the maintenance crew.

FIG. 4 illustrates how a user 40 may request cleaning using soft button 42 on the touch screen of device 10. As well as cleaning, other actions may be requested. The request arrives at the terminal 44 of a maintenance crew member, in a manner that identifies the nature and location of the request, say by showing an image indicating the type of request and providing some text indicating the location. The maintenance crew may then attends to the request. The maintenance crew may then close, or cancel, the request on the terminal, screen 46, once attended to, say by touching a button representing the request to change the button from an active to a passive version of the button, say greyed out. It is also possible to identify the worker, using RFID, and an RF ID tag worn by the worker so that he does not need to close the incident on the touch screen. Screen 48 shows various possible tasks for a given maintenance space, so that different tasks for the same space may be individually set and individually responded to and cancelled.

In an embodiment, during the time between making a complaint and closing a request, the number of entries of users to the space continues to be gathered. The number of users exposed to the problem may thus be obtained, and may provide a significant reporting parameter.

Figure 5:
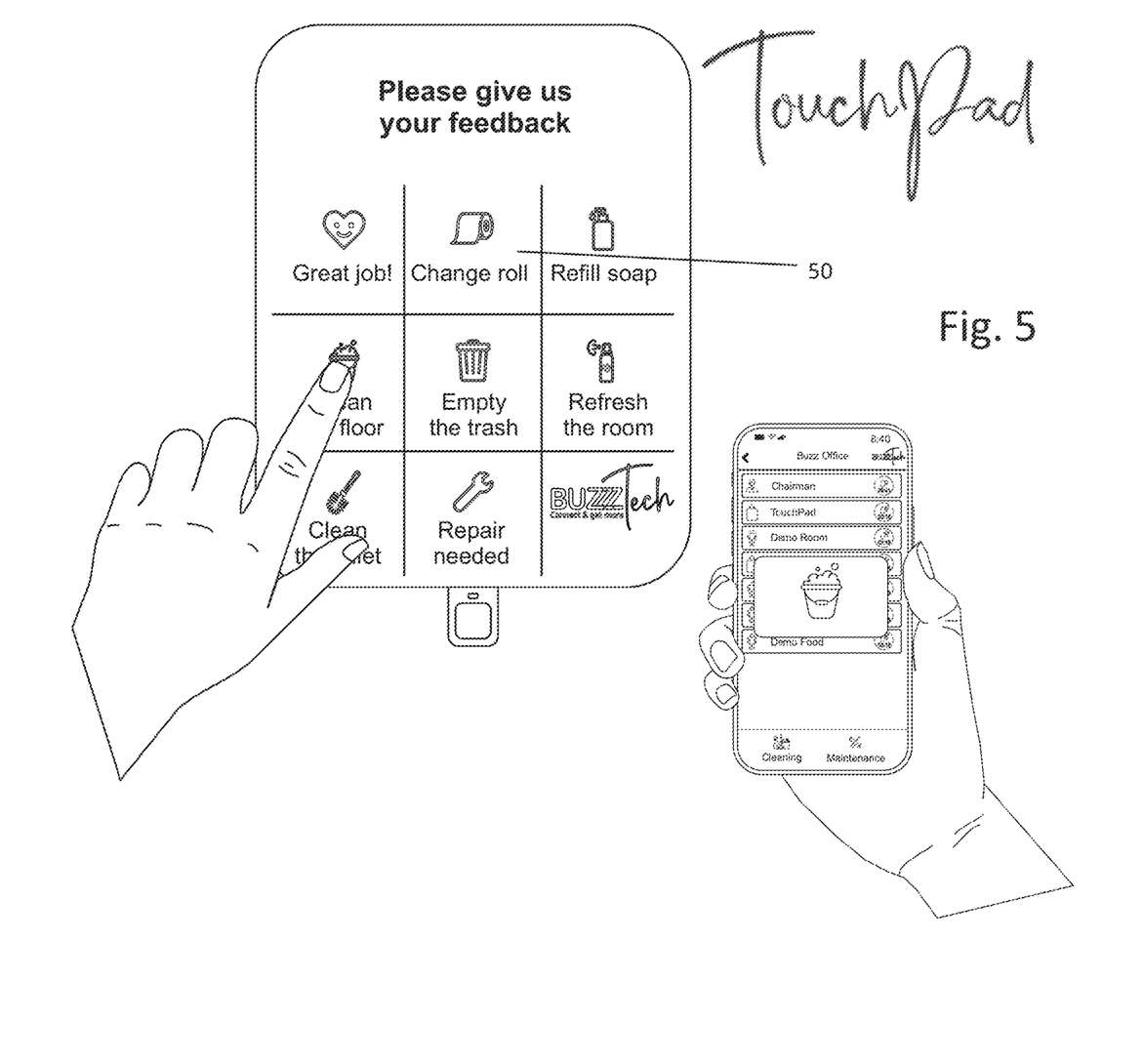
FIG. 5 is a simplified view of a touch screen for a customer to provide feedback.

Reference is now made to FIG. 5, which illustrates a customer feedback screen. The customer sees the screen at the entrance to the maintenance space and is invited to provide feedback, either complementing the team or requesting specific tasks. The tasks that may be requested need not be restricted to cleaning and hygiene and may also relate to general maintenance and repairs and changing lightbulbs and the like.

Figure 6:
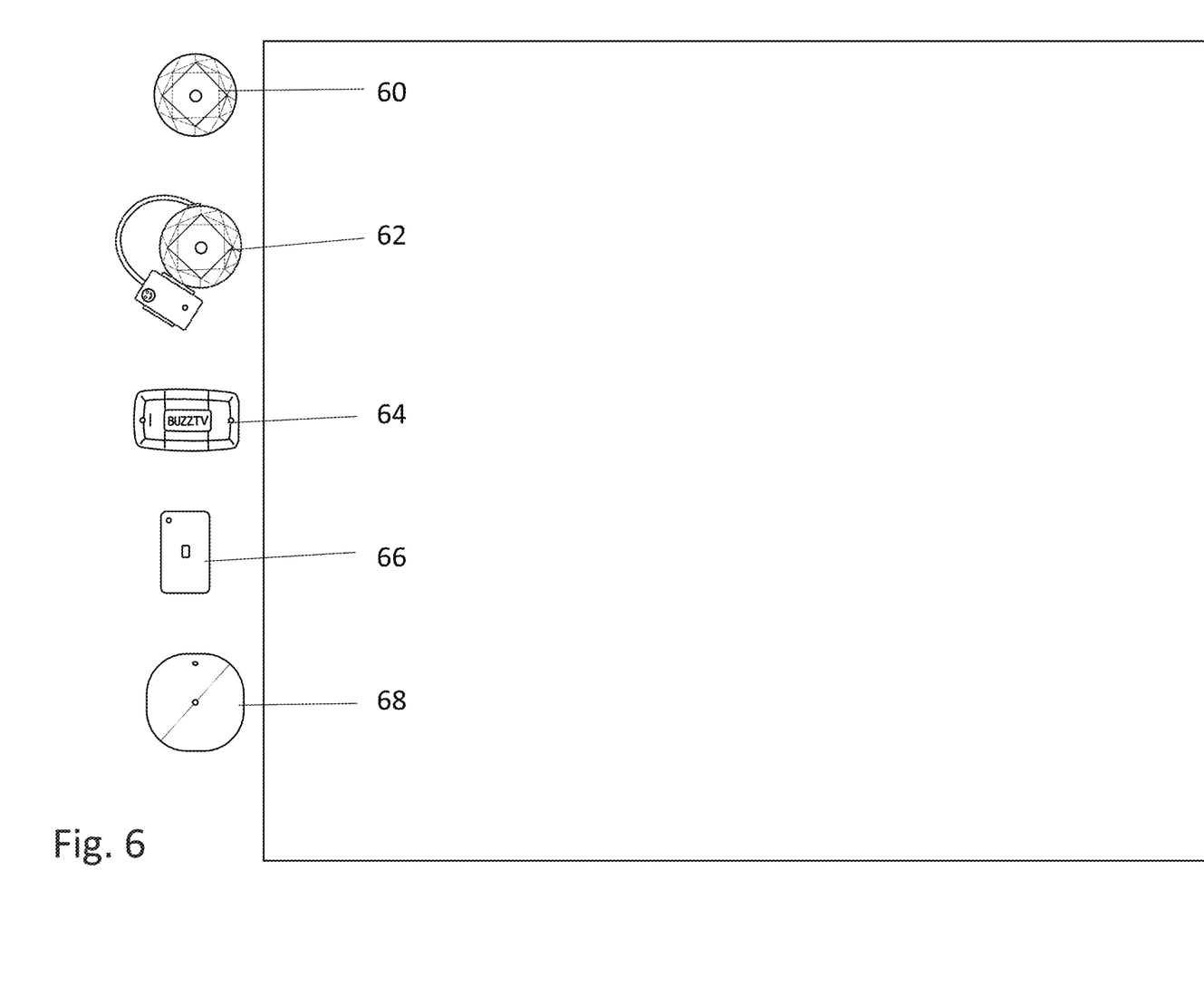
FIG. 6 is a simplified diagram showing a sequence of sensors that may be used with embodiments of the present invention.

Reference is now made to FIG. 6, which illustrates additional sensors that may be connected so as not to rely on customers to receive alerts. Paper sensor 60 may be fitted onto hand-towel dispensers to ascertain when the supply of paper towels is running low, at which point an alert may be sent to the appropriate personnel.

Liquid level sensor 62 may detect the level of liquid or gel in a soap or disinfectant dispenser, and likewise an alert may be sent to the appropriate personnel as levels run low.

Double toilet paper sensor 64 may be attached to a toilet paper dispenser, again with the aim of giving advance warning of paper running out. The sensor is suitable for dispensers that have a main and a reserve roll, hence the use of the term "double".

Data from the above sensors may be used to analyze usage patterns of soap, paper towels, toilet paper etc., hereinafter consumables, as over the course of time, such consumables may be big budget items. The usage analysis may allow the system to indicate that new stock needs to be ordered, or may even order the stock itself automatically.

Sensors 66 and 68 are both sensors that may be placed at the entrance to the space to count the numbers of entries and exits. Both use laser technologies to gauge changes in distance. The larger sensor 68 includes a Bluetooth™ unit that communicates via Bluetooth™ with the other sensors in the space, and may also include a beacon for detecting workers' identity tags. More generally, the sensors may use any of WiFi, Bluetooth™ and LoRa as appropriate, and may be battery powered particularly when mains power is not be available at the exact location. Bathrooms being locations where water is present and thus the provision of extra wiring to power sensors may not always be an available or safe option.

Figure 7:
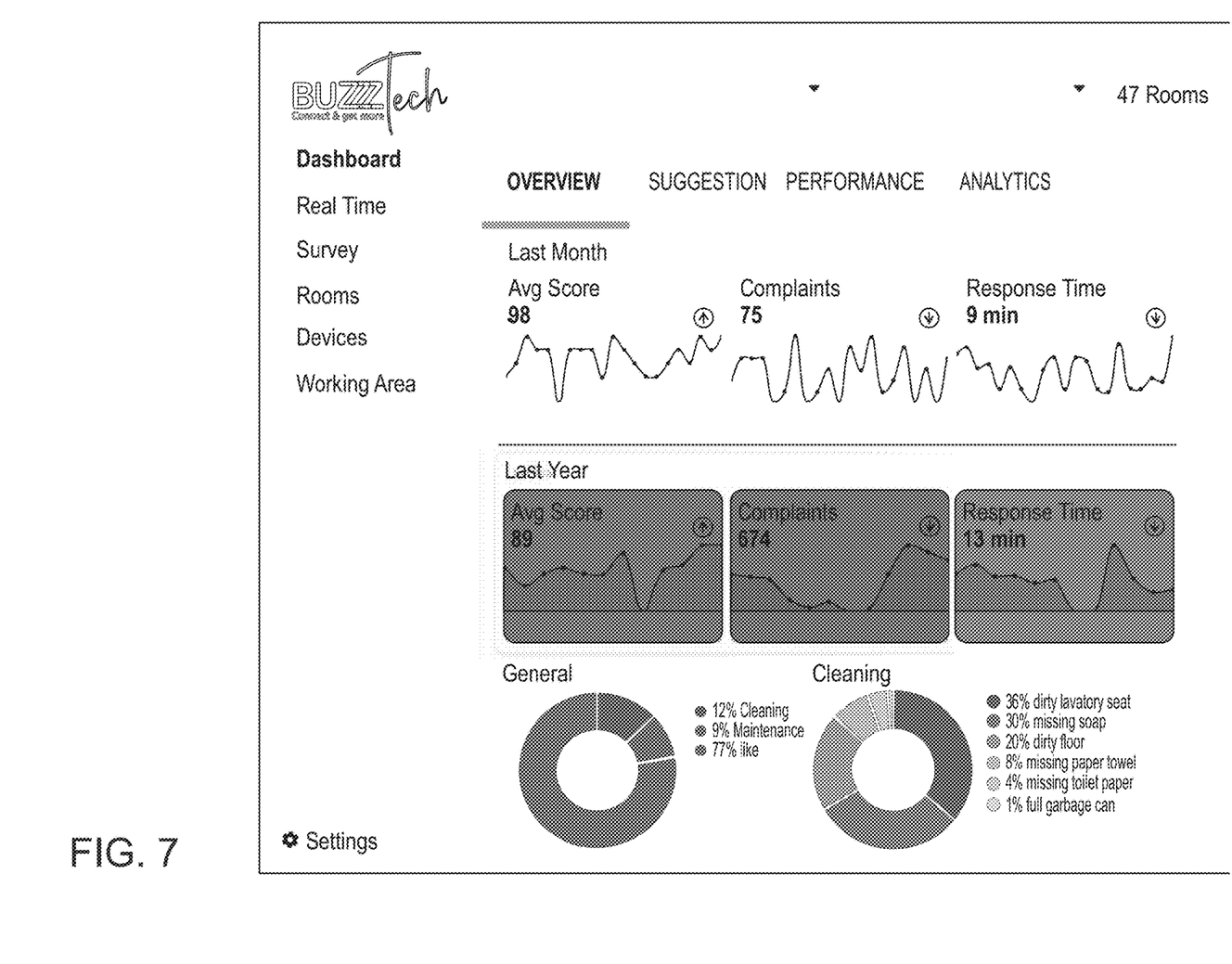
FIG. 7 is an exemplary view of a screen at a supervisor or control station according to embodiments of the present invention.

FIG. 7 illustrates a screen 70 that might be shown at the control station 34—See FIG. 2. Charts show various statistics regarding cleaning and maintenance, such as time for the maintenance crew to arrive. As the user touches a button on the screen 70, the corresponding symbol may appear on the mobile telephone of the relevant personnel, so that hygiene and cleaning issues may be sent to cleaning personnel, and requests for repair may go a designated repair person or team.

The cloud-based system may include learning technology. Thus it may become apparent that certain spaces start getting complaints after a smaller number of visits than others. The system may thus change the threshold for calling for maintenance for that given space.

Reference herein to cleaning and maintenance teams may include references to cleaning and other robots. Cleaning robots are currently widely used for washing floors and may be called and interacted with using the present embodiments. Indeed operation of the touch screen may interact directly with such robots, and likewise the sensors may interact with the robot. Thus, in one example, if a user complains of a smell, the system may directly engage operation of a fragrance dispenser. In another example, the counter reaching a threshold number of users may cause an activation command to a cleaning robot.

Figure 8:
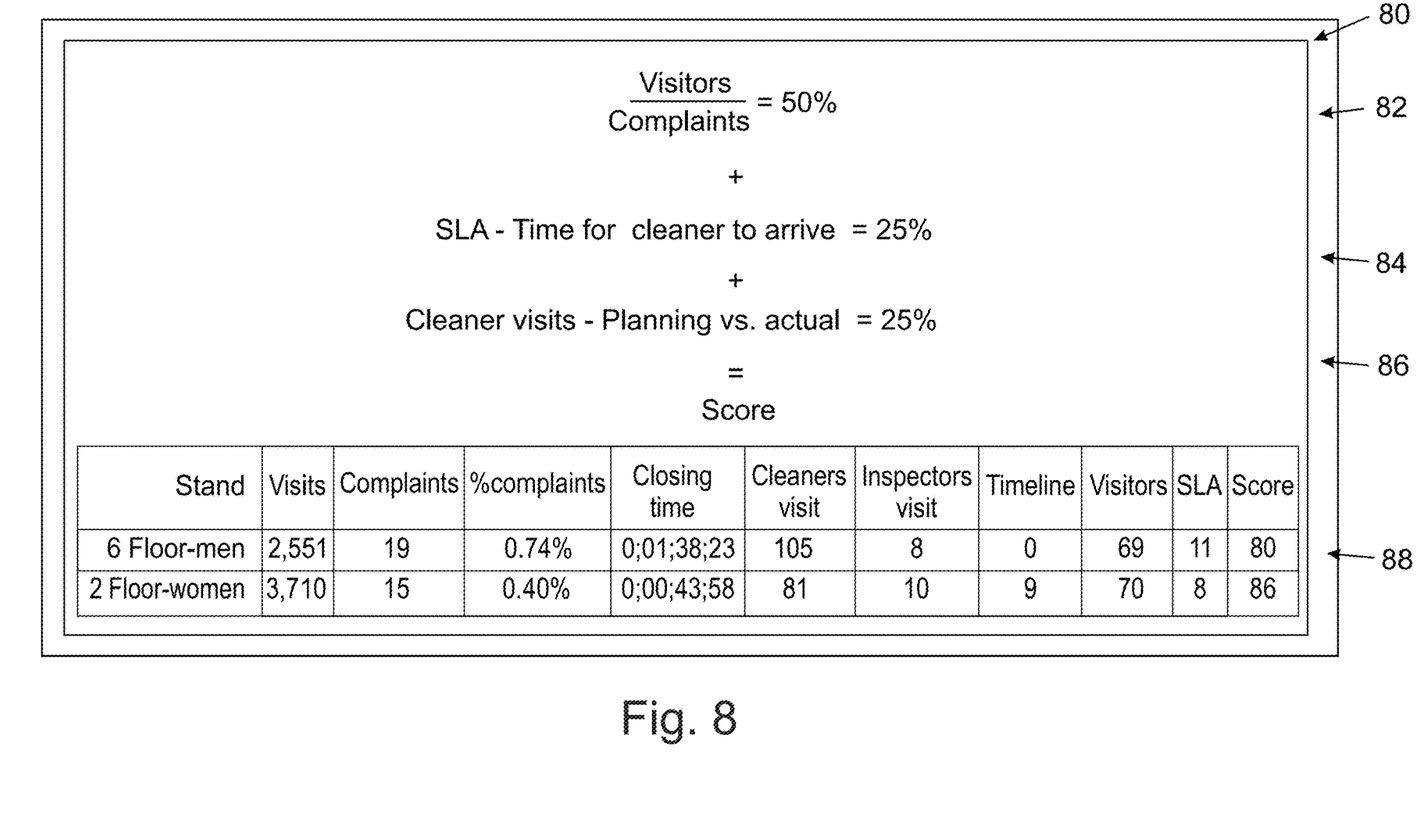
FIG. 8 is a simplified diagram an exemplary scoring system for use in embodiments of the present invention.

Reference is now made to FIG. 8, which is a simplified diagram illustrating how exemplary embodiments of the present invention may apply scores in order to evaluate the effectiveness of cleaning and/or maintenance in a given operation. The embodiment may provide a way of calculating a score that reflects the cleanliness and/or maintenance of areas and public buildings in a reliable and correct way, which allows for better control and supervision.

A reliable and agreed on score may be helpful and avoiding disagreement between the customer and the cleaning supplier and I or the maintenance of the cleanliness status in the building.

To date it is common that the customer is not satisfied with the cleanliness and the supplier claims that it is clean. The main problem is that there is no agreed measurement of what is clean or a way of determining objectively whether premises are being maintained satisfactorily, and currently, the main method in use is that of satisfaction surveys allowing the customer to choose between various options or ranges based on their subjective impressions.

Using the present embodiments, however, information may be collected by IOT sensors from the selected area, and analyzed by the software as will be described in greater detail below to obtain an objective score for cleanliness and maintenance status in the field.

The embodiment may collect real-time data during the course of the day from the agreed areas and produce a score for cleanliness and or maintenance that reflects the situation of a specific location in the building at any given time. The score may be a percentage, ranging from 0 to 100%.

The grades are made up of separate scores from specific areas that may be determined by agreement between the customer and the supplier.

The customer and supplier may both be sent the basic data and may agree on the grading criteria. In the present embodiments, information gathered by sensors, say measuring smell, may be combined with reactions from users and with response times and further with how well the cleaning visits fit with a preset plan. The combined information may produce an overall score.

As shown in FIG. 8, an assessment screen 80 shows a ratio of total visitors over number of complaints 82 as one input. A time for a cleaner to arrive following a complaint is shown as a second input 84. A difference between actual and planned cleaner visits provides a third input 86. At the bottom of the screen a table 88 shows various assessment data for difference maintenance locations and gives a score for each location. Separate scores for different locations may be aggregated to give an overall score.

The score may include inputs from user interactions with the touch panel, as discussed. A total number of users may be obtained from the people counter sensors. Other sensors may indicate the consumption state of soap, toilet paper, hand towels, and the state of the trash bin.

As discussed, an input for the score may entail calculating the ratio between the number of users and number of complainants+arrival time to close the complaint (SLA).

A further input may be obtained from a comparison between the number of cleaning or maintenance visits agreed upon versus actual visits.

In use, a person enters to the restroom and sees a cleaning problem such as a wet floor, and the person may press on the Touch panel on the appropriate icon. The panel may send a message to the mobile phones of the supervisor and cleaner team responsible, and the cleaner may come to the particular restroom to clean up the wet floor.

After cleaning the floor, the cleaner may press on the appropriate icon to close the complaint.

In reaction to the above sequence of events, The system may calculate the time that elapses from the moment the person presses on the complaint till the cleaner cleans the floor and closes the complaint, and this is hereinafter the SLA TIME. The system may further be able to determine how many entries there were during the interval between the complaint and between the close. Thus an assessment can be made of the number of users who were exposed to the dirty floor.

The system may further calculate the number of people entering over the course of the day and may divide it by the number of the complaints. A high grade indicates many users and few complaints.

If the arrangement is for eight cleaning visits over the course of the day, but in practice the cleaner only turns up four times to clean the restroom a grade of 50% may be applied to the appropriate part of the score.

The system may aggregate the various stages to obtain an overall score for the given restroom.

Automatic calls may be generated, for example when sensors indicate that consumables, toilet paper, soap, towels, need to be replenished, or that the restroom has been used by a threshold number of people since the last cleaning. The call may be timed so that the cleaner, based on average SLA time, arrives when the level of the consumable reaches 5% or some similarly chosen threshold level. Likewise, when the trash bin is full then a call may be sent to the cleaner.

All of the above data may be sent to a calculation system which may be located in the cloud and may include an AI system and the calculation system may then work out the grades.

The embodiments may thus provide an algorithm for calculating a score that reflects the cleanliness and/or maintenance state of areas and public buildings in a reliable and objective way, which allows control and supervision. Thus, in the present embodiments, there is information collected by IOT sensors from the selected areas, and from users interacting via the touch panel, and the data may be analyzed to give a score for the actual cleanliness and maintenance status in the field.

It is expected that during the life of a patent maturing from this application many relevant network and touchscreen technologies will be developed and the scopes of these and corresponding terms are intended to include all such new technologies a priori.

The terms "comprises", "comprising", "includes", "including", "having" and their conjugates mean "including but not limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment and the present description is to be construed as if such embodiments are explicitly set forth herein. Conversely, various features of the invention, which are, for brevity, described in the context of a single embodiment, may also be provided separately or in any suitable subcombination or may be suitable as a modification for any other described embodiment of the invention and the present description is to be construed as if such separate embodiments, subcombinations and modified embodiments are explicitly set forth herein. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A device for placing at the entrance to a maintenance space, the device comprising:
   a counter configured to count a number of persons passing the entrance;
   a touchscreen configurable for obtaining structured data about said maintenance space, wherein said touchscreen has a first touchscreen configuration for obtaining maintenance reports from maintenance staff and a second touchscreen configuration, different from said first configuration, for obtaining reactions and requests from the general public, wherein at least one of said first and said second touchscreen configurations comprises at least one additional touchscreen configuration, said additional touchscreen configuration being reachable by selection of an option on said at least one of said first and second touchscreen configurations, and wherein said touchscreen is configured with configurable soft buttons and is configured to distinguish between short and long presses on said buttons, and wherein said short presses are for operation within ones of said touchscreen configurations and said long presses are for reaching other ones of said touchscreen configurations; and
   a transmitter, associated with said counter and with said touchscreen, for transmitting counting results and said structured data to a remote location.

2. The device of claim 1, configured to interact via a telephone application.

3. The device of claim 1, wherein said touchscreen has a switch configuration for selecting between said first configuration and said second configuration.

4. The device of claim 1, configured with a threshold number, wherein a request for a cleaner or cleaning team or maintenance team or cleaning robot is issued via said transmitter when said counter exceeds said threshold number.

5. The device of claim 1, configured to identify maintenance staff via an RFID tag, for obtaining said maintenance reports.

6. The device of claim 1, comprising a battery power source.

7. The device of claim 1, wherein said transmitter is configured with a network protocol for a radio-based network.

8. A device for placing at the entrance to a maintenance space, the device comprising:
   a counter configured to count a number of persons passing the entrance;
   a touchscreen configurable for obtaining structured data about said maintenance space, wherein said touchscreen has a first touchscreen configuration for obtaining maintenance reports from maintenance staff and a second touchscreen configuration, different from said first configuration, for obtaining reactions and requests from the general public, wherein at least one of said first and said second touchscreen configurations comprises at least one additional touchscreen configuration, said additional touchscreen configuration being reachable by a switch configuration, the switch configuration being for selecting between said first configuration and said second configuration, and wherein said short presses are for operation within ones of said touchscreen configurations and said long presses are for reaching other ones of said touchscreen configurations; and
   a transmitter, associated with said counter and with said touchscreen, for transmitting counting results and said structured data to a remote location.

9. A cloud-based system for building maintenance comprising:
   a plurality of devices located at entrances to spaces of said building requiring maintenance, the devices respectively comprising counters for counting persons crossing said respective entrances, touchscreens for obtaining structured data regarding said spaces, wherein said touchscreens respectively have a first touchscreen configuration for obtaining maintenance reports from maintenance staff and a second touchscreen configuration for obtaining reactions and requests from the general public, and transmitters for relaying count information and structured data information wirelessly to the cloud, wherein at least one of said first and said second touchscreen configurations comprises at least one additional touchscreen configuration, said additional touchscreen configuration being reachable by selection of an option on said at least one of said first and second touchscreen configurations, and wherein said touchscreen is further configured with configurable soft buttons and is configured to distinguish between short and long presses on said buttons, and wherein said short presses are for operation within ones of said touchscreen configurations and said long presses are for reaching other ones of said touchscreen configurations; and
   a remote location based in the cloud configured to obtain information from said plurality of devices and schedule maintenance operations at said spaces.

10. The cloud-based system of claim 9, further comprising terminal applications networked via said remote location, said terminal applications configured to work on mobile communication devices and configured to obtain directions regarding maintenance operations.

11. The cloud-based system of claim 9, further comprising a control station in communication with said remote location, the control station configured to obtain said count information and said structured data from the cloud.

12. The cloud-based system of claim 9, wherein said touchscreen has a third, switch, configuration for selecting between said first configuration and said second configuration.

13. The cloud-based system of claim 9, configured with a threshold number, wherein a request for a cleaner or a cleaning team or a maintenance team or a cleaning robot is issued via said transmitter when said counter exceeds said threshold number.

14. The cloud-based system of claim 9, configured to determine from any of a call and a sensor detection an incident start time, and further to determine an incident end time, and further configured to determine a number of persons exposed to said incident from a number of persons detected by a respective counter as entering between said incident start time and said incident end time.

15. The cloud-based system of claim 9, wherein said devices at entrances comprise a battery power source.

16. The cloud-based system of claim 9, configured to communicate using a network protocol for a radio-based network.

17. The cloud-based system of claim 9, configured to operate robots based on one member of the group consisting of respective user action requests and sensor activation and activation due to a counter reaching a threshold number.

18. The cloud-based system of claim 9, configured to calculate a cleaning effectiveness score for respective ones of said spaces requiring maintenance.

19. The cloud-based system of claim 9, further comprising sensor devices for monitoring levels of consumables, the system being configured to issue a call to prevent a level of a consumable fall below a given threshold.

20. The cloud-based system of claim 19, further configured to place an order for new stock of a consumable.

21. The cloud-based system of claim 19, wherein a timing of said call issuance is based on an average time to answer a call, such that the time the call is made, added to the average time to answer the call, adds up to a time at which the level of the consumable is estimated to fall to said threshold level.

* * * * *